(12) United States Patent
Fullerton et al.

(10) Patent No.: US 8,810,348 B2
(45) Date of Patent: Aug. 19, 2014

(54) SYSTEM AND METHOD FOR TAILORING POLARITY TRANSITIONS OF MAGNETIC STRUCTURES

(71) Applicant: Correlated Magnetics Research, LLC, Huntsville, AL (US)

(72) Inventors: Larry W. Fullerton, New Hope, AL (US); Jacob S. Zimmerman, St. Paul, MN (US); Robert S. Evans, Austin, TX (US); Mark D. Roberts, Huntsville, AL (US)

(73) Assignee: Correlated Magnetics Research, LLC., Huntsville, AL (US)

( * ) Notice: Subject to any disclaimer, the term of this patent is extended or adjusted under 35 U.S.C. 154(b) by 0 days.

(21) Appl. No.: 14/045,756

(22) Filed: Oct. 3, 2013

(65) Prior Publication Data

US 2014/0028426 A1    Jan. 30, 2014

Related U.S. Application Data

(63) Continuation-in-part of application No. 13/240,335, filed on Sep. 22, 2011, now Pat. No. 8,648,681, which is a continuation-in-part of application No. 12/476,952, filed on Jun. 2, 2009, now Pat. No. 8,179,219, and a continuation-in-part of application No. 12/895,589, filed on Sep. 30, 2010, which is a continuation-in-part of application No. 12/885,450, filed on Sep. 18, 2010, now Pat. No. 7,982,568, and a continuation-in-part of application No. 12/476,952, filed on Jun. 2, 2009, now Pat. No. 8,179,219.

(60) Provisional application No. 61/744,864, filed on Oct. 4, 2012, provisional application No. 61/403,814, filed on Sep. 22, 2010, provisional application No. 61/462,715, filed on Feb. 7, 2011, provisional application No. 61/277,214, filed on Sep. 22, 2009, provisional application No. 61/277,900, filed on Sep. 30, 2009, provisional application No. 61/278,767, filed on Oct. 9, 2009, provisional application No. 61/279,094, filed on Oct. 16, 2009, provisional application No. 61/281,160, filed on Nov. 13, 2009, provisional application No. 61/283,780, filed on Dec. 9, 2009, provisional application No. 61/284,385, filed on Dec. 17, 2009, provisional application No. 61/342,988, filed on Apr. 22, 2010.

(51) Int. Cl.
*H01F 7/02* (2006.01)
*H01F 13/00* (2006.01)

(52) U.S. Cl.
CPC .............. *H01F 7/021* (2013.01); *H01F 13/003* (2013.01)
USPC .......................................... 335/302; 335/284

(58) Field of Classification Search
CPC ................................ H01F 7/021; H01F 13/003
USPC ..................................................... 335/284, 302
See application file for complete search history.

(56) References Cited

U.S. PATENT DOCUMENTS

| | | | |
|---|---|---|---|
| 4,614,929 A * | 9/1986 | Tsukuda et al. | 335/284 |
| 5,200,729 A * | 4/1993 | Soeda et al. | 335/284 |
| 5,557,248 A * | 9/1996 | Prochazka | 335/284 |

*Primary Examiner* — Ramon Barrera
(74) *Attorney, Agent, or Firm* — Venable LLP; Robert S. Babayi; George L. Howarah

(57) ABSTRACT

A system and method for tailoring a polarity transition of a magnetic structure is provided that involves printing one or more reinforcing maxels alongside one side or both sides of a polarity transition boundary between a first polarity region of the magnetic structure having a first polarity and a second polarity region of the magnetic structure having a second polarity, where printing reinforcing maxels alongside the polarity transition boundary improves the magnetic field characteristics of the polarity transition.

20 Claims, 9 Drawing Sheets

(Top View)

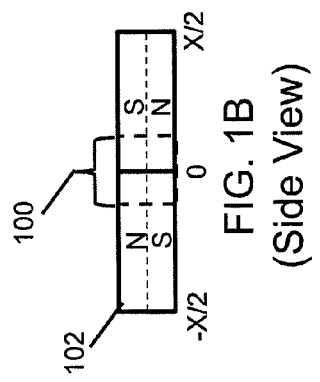
FIG. 1B (Side View)
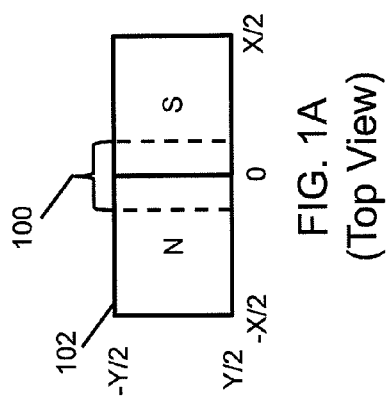
FIG. 1A (Top View)
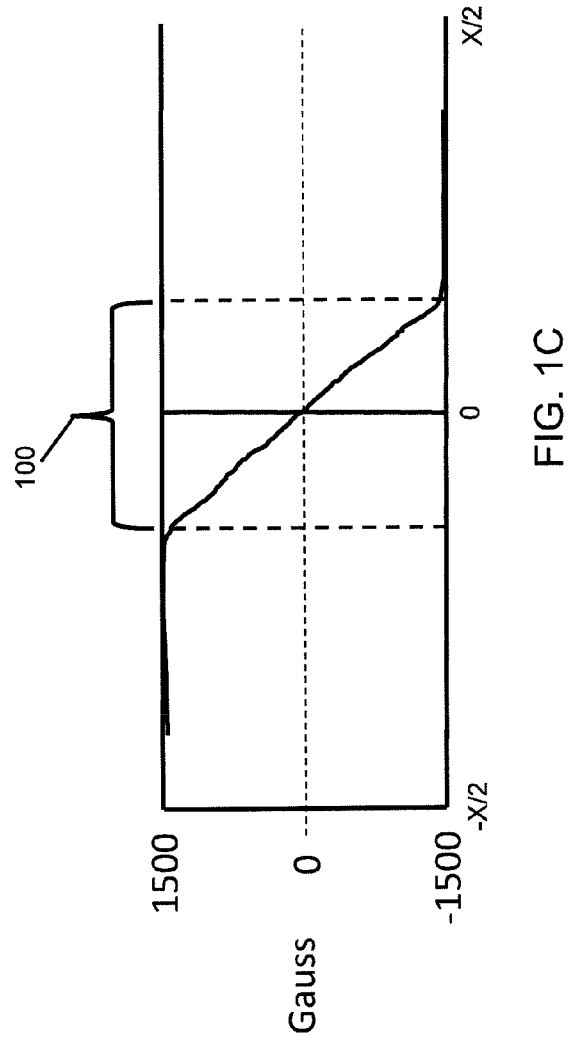
FIG. 1C

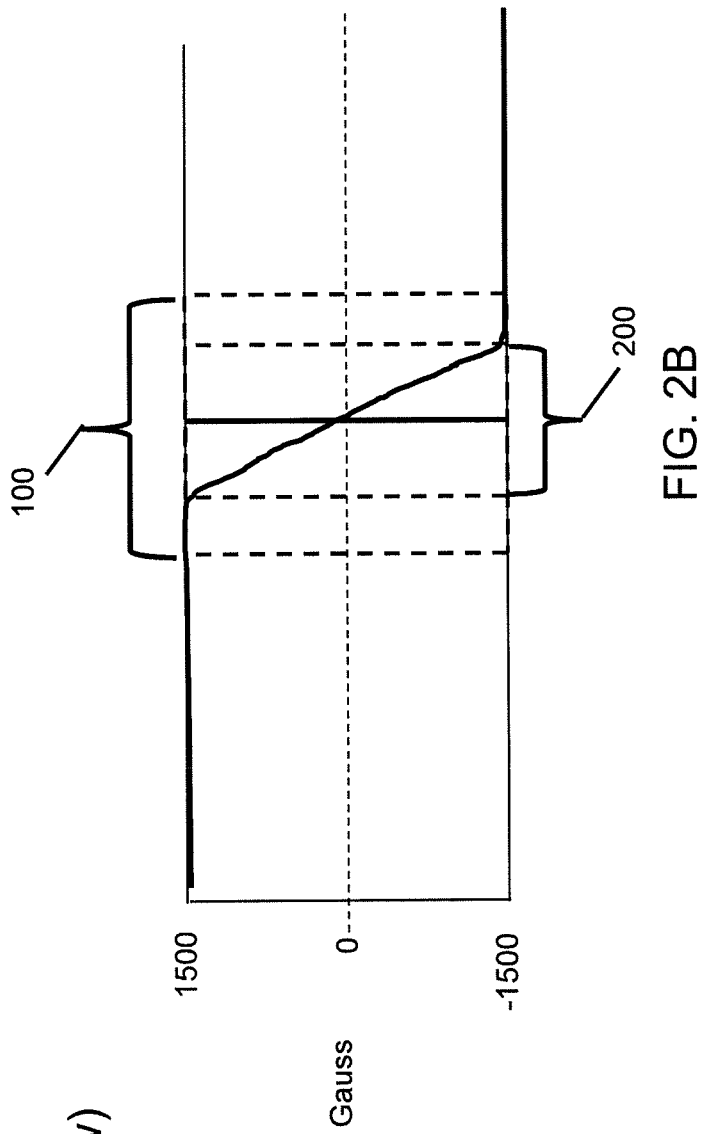
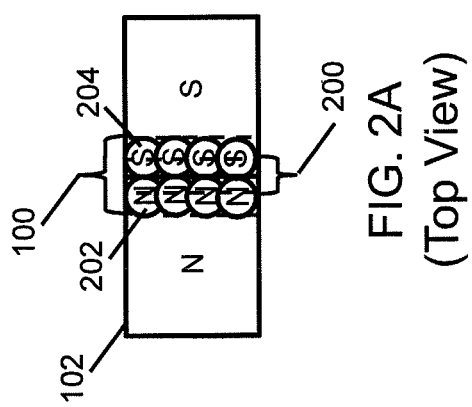
FIG. 2A
(Top View)
FIG. 2B (Top View)

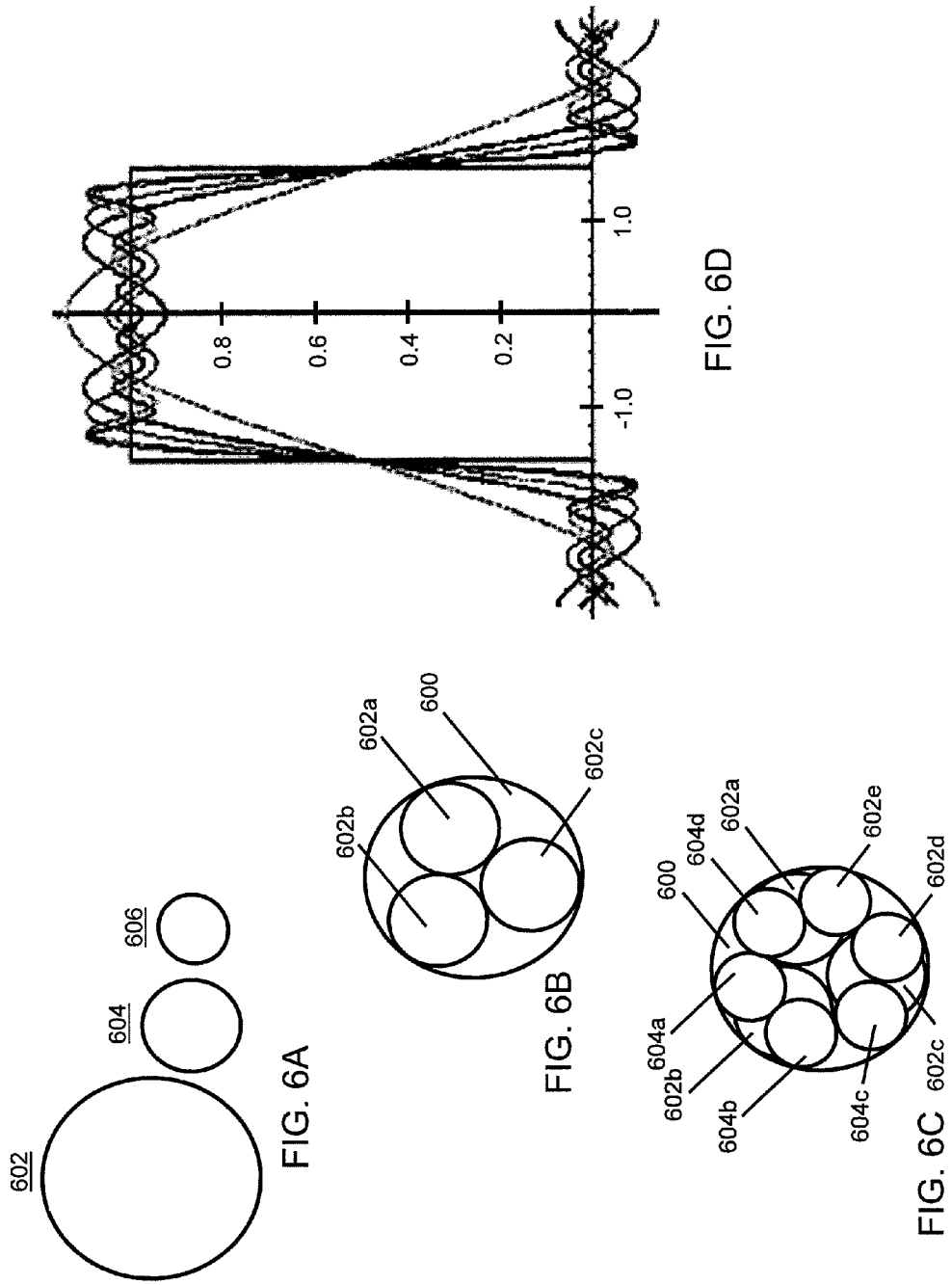

(Side View)

(Top View)

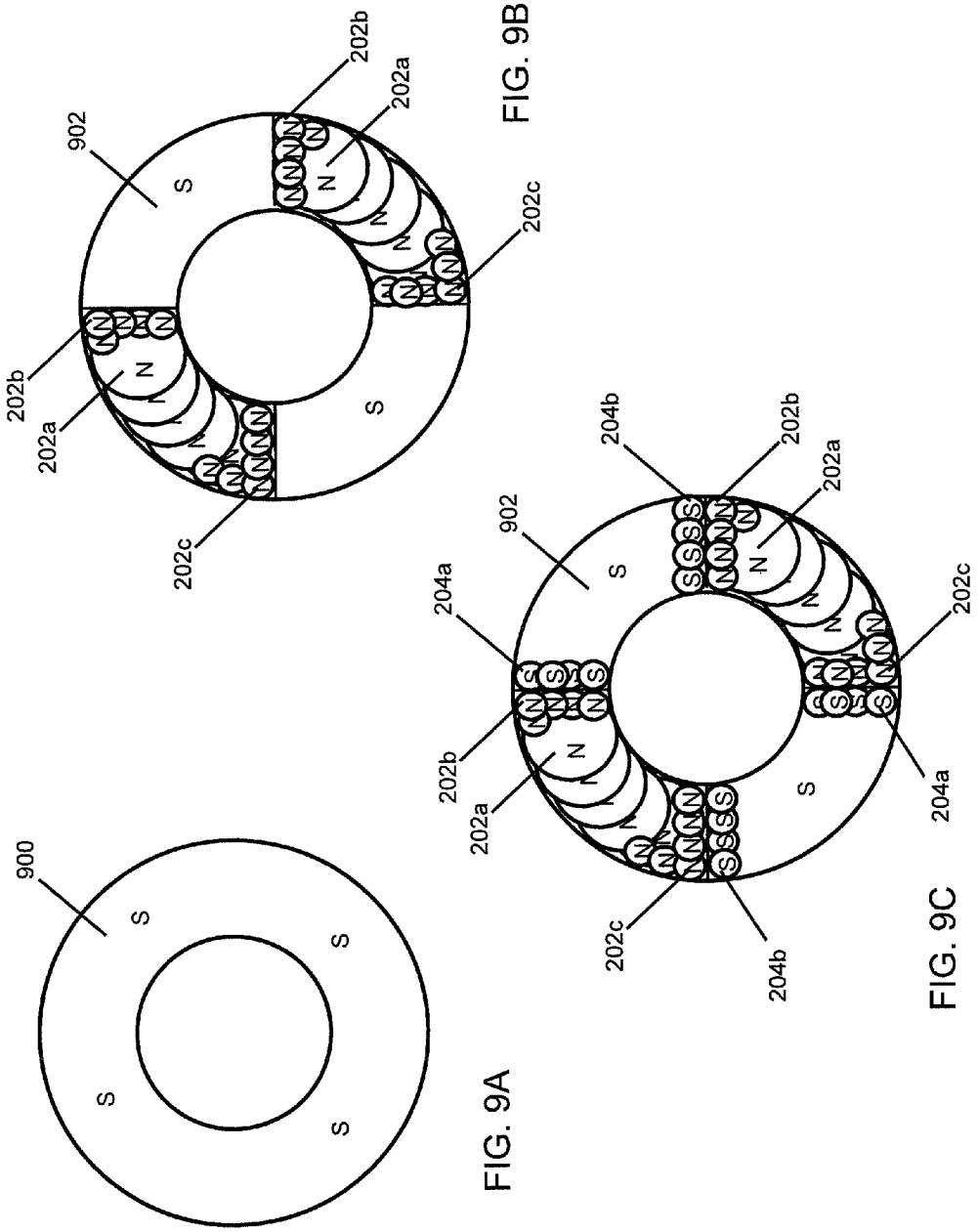

SYSTEM AND METHOD FOR TAILORING POLARITY TRANSITIONS OF MAGNETIC STRUCTURES

CLAIMING BENEFIT OF PRIOR FILED U.S. APPLICATIONS

This Nonprovisional patent application claims the benefit of U.S. Provisional Patent Application No. 61/744,864 (filed Oct. 4, 2012), which is entitled "SYSTEM AND METHOD FOR TAILORING POLARITY TRANSITIONS OF MAGNETIC STRUCTURES"; and this Nonprovisional patent application is also a continuation-in-part of U.S. Nonprovisional patent application Ser. No. 13/240,335 (filed Sep. 22, 2011), which is entitled "MAGNETIC STRUCTURE PRODUCTION", which claims the benefit of U.S. Provisional Patent Application No. 61/403,814 (filed Sep. 22, 2010) and U.S. Provisional Patent Application No. 61/462,715 (filed Feb. 7, 2011), both of which are entitled "SYSTEM AND METHOD FOR PRODUCING MAGNETIC STRUCTURES"; Ser. No. 13/240,335 is a continuation-in-part of U.S. Nonprovisional Patent Application No. 12/476,952 (filed Jun. 2, 2009), which is entitled "FIELD EMISSION SYSTEM AND METHOD"; Ser. No. 13/240,335 is also a continuation-in-part of U.S. Nonprovisional patent application Ser. No. 12/895,589 (filed Sep. 30, 2010), which is entitled "A SYSTEM AND METHOD FOR ENERGY GENERATION", which claims the benefit of Provisional Patent Application Nos. 61/277,214 (filed Sep. 22, 2009), 61/277,900 (filed Sep. 30, 2009), 61/278,767 (filed Oct. 9, 2009), 61/279,094 (filed Oct. 16, 2009), 61/281,160 (filed Nov. 13, 2009), 61/283,780 (filed Dec. 9, 2009), 61/284,385 (filed Dec. 17, 2009) and 61/342,988 (filed Apr. 22, 2010), is also a continuation-in-part of Nonprovisional Patent Application Nos. 12/885,450 (filed Sep. 18, 2010) and 12/476,952 (filed Jun. 2, 2009); and this Nonprovisional patent application is also a continuation-in-part of U.S. patent application Ser. No. 13/246,584, filed Sep. 27, 2011, which is entitled "System and Method for Producing Stacked Field Emission Structures". The contents of the provisional patent applications, the contents of the nonprovisional patent applications, and the contents of the issued patents that are identified above are hereby incorporated by reference in their entirety herein.

FIELD OF THE INVENTION

The present invention relates generally to a system and method for tailoring polarity transitions of multiple pole magnetic structures. More particularly, the present invention relates to tailoring polarity transitions of multiple pole magnetic structures by spot magnetizing on one or more sides of polarity transition boundaries.

SUMMARY OF THE INVENTION

In accordance with one aspect of the invention, a magnetic structure having multiple poles includes a first polarity region magnetized to have a first polarity, a second polarity region magnetized to have a second polarity, and a polarity transition boundary, the first polarity region having at least one reinforcing maxel that was printed alongside said polarity transition boundary and the second polarity region having at least one reinforcing maxel having the second polarity that was printed alongside the polarity transition boundary.

The at least one reinforcing maxel having the first polarity and the at least one reinforcing maxel having the second polarity can change magnetic field characteristics across a polarity transition, where the slope of the polarity transition is made steeper.

The at least one reinforcing maxel having the first polarity and said at least one reinforcing maxel having the second polarity may enable more efficient use of magnetic material.

The at least one reinforcing maxel having the first polarity and the at least one reinforcing maxel having the second polarity may produce higher torque.

The at least one reinforcing maxels having the first polarity may include a round maxel.

The at least one reinforcing maxels having the first polarity may include an elongated maxel that may be a rectangular maxel.

The at least one reinforcing maxels having the first polarity may include a first maxel that overlaps a second maxel.

The at least one reinforcing maxels having the first polarity may include a row of maxels, where a row of maxels may include maxels printed next to each other.

The at least one reinforcing maxels having the first polarity may include maxels having different sizes.

The at least one reinforcing maxels having the first polarity comprises maxels having different shapes.

The at least one reinforcing maxels having the first polarity comprises maxels having different amplitudes.

The magnetic structure can be produced by printing a maxel having said first polarity onto a side of a single pole magnet having said second polarity.

The magnetic structure may include three or more polarity regions.

The three or more polarity regions can have an irregular polarity pattern, which may be in accordance with a designed code such as a Barker code.

The three or more polarity regions have an alternating polarity pattern.

In accordance with another aspect of the invention, a method for tailoring a polarity transition of a magnetic structure includes selecting a first side of a polarity transition boundary of a polarity transition of said magnetic structure, the polarity transition having a first polarity on the first side of said polarity transition boundary, the polarity transition having a second polarity on a second side of the polarity transition boundary, the second polarity being opposite said first polarity, the polarity transition having first magnetic field characteristics; and printing one or more reinforcing maxels having the first polarity alongside the polarity transition boundary on the selected first side of the polarity transition boundary, the printing of the one or more reinforcing maxels causing said polarity transition to have second magnetic field characteristics.

The first magnetic field characteristics may correspond to a first magnetic field cross section curve that begins at a first point having a first polarity field strength and ends at a second point corresponding to a second polarity field strength that can be characterized by a line having a first slope, where the second magnetic field characteristics correspond to a second magnetic field cross section curve that begins at a third point having a first polarity field strength and ends at a fourth point corresponding to a second polarity field strength that can be characterized by a line having a second slope that is steeper than the first slope.

The one or more reinforcing maxels may include a round maxel.

The one or more reinforcing maxels may include an elongated maxel that may be a rectangular maxel.

The one or more reinforcing maxels may include a first maxel that overlaps a second maxel.

The one or more reinforcing maxels may include a row of maxels, where the row of maxels may include maxels printed next to each other.

The one or more reinforcing maxels may include maxels having different sizes.

The one or more reinforcing maxels may include maxels having different shapes.

The one or more reinforcing maxels may include maxels having different amplitudes.

The magnetic structure may be produced by printing a maxel having the first polarity onto a side of a single pole magnet having the second polarity.

The magnetic structure may have three or more polarity regions, which can have an irregular polarity pattern that may be produced randomly. Alternatively, the irregular pattern may be in accordance with a designed code such as a Barker code.

The magnetic structure may have three or more polarity regions having an alternating polarity pattern.

The method may also include printing one or more additional reinforcing maxels having the second polarity alongside the polarity transition boundary on the second side of the polarity transition boundary.

The printing of reinforcing maxels may result in at least one of more efficient use of magnetic material, higher torque production, or enabling use of a smaller coil while achieving comparable performance.

BRIEF DESCRIPTION OF THE DRAWINGS

A more complete understanding of described embodiments may be obtained by reference to the following detailed description when taken in conjunction with the accompanying drawings wherein:

FIG. 1A depicts a top view of an exemplary axially magnetized conventional multiple pole magnet having a North polarity side and South polarity side that are separated by a polarity transition boundary;

FIG. 1B depicts a side view of the exemplary multiple pole magnet of FIG. 1A;

FIG. 1C depicts an exemplary magnetic field cross section of the multiple pole magnet of FIGS. 1A and 1B;

FIG. 2A depicts a top view of exemplary reinforcing North polarity maxels and exemplary reinforcing South polarity maxels printed alongside the polarity transition boundary;

FIG. 2B depicts an exemplary magnetic field cross section of the multiple pole magnet of FIG. 2A after printing of reinforcing maxels;

FIGS. 6A-6C depict three exemplary maxel sizes and the printing of patterns of different sizes of maxels within an area;

FIG. 6D depicts an exemplary radio frequency pulse produced by combining harmonics of radio frequency sine wave signals;

FIG. 9A depicts the South polarity side of an exemplary conventional single pole magnet;

FIG. 9B depicts an exemplary multiple pole magnet produced by printing patterns of maxels including reinforcing maxels onto portions of the single pole magnet of FIG. 9A; and FIG. 9C depicts printing of reinforcing maxels on the South polarity sides of the four polarity transition boundaries of the multiple pole magnet of FIG. 9B.

DETAILED DESCRIPTION OF THE INVENTION

Figure 3A:
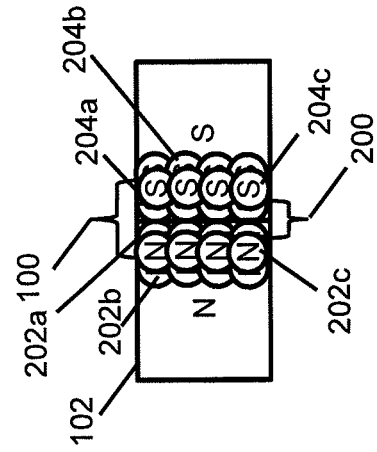
FIGS. 3A-3D present various exemplary patterns of reinforcing maxels.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The present invention pertains to a system and method for tailoring polarity transitions of multiple pole magnetic structures (i.e., multiple pole magnets). Multiple pole structures have two or more polarity regions on the same side (or surface) of material, where one skilled in the art will recognize that multiple pole structures are generally intended to replace combinations of single pole magnets that have only one polarity region on a given side of material. Certain described embodiments may relate, by way of example but not limitation, to systems and/or apparatuses comprising magnetic structures, methods for using magnetic structures, magnetic structures produced via magnetic printing, magnetic structures comprising arrays of discrete magnetic elements, combinations thereof, and so forth. Example realizations for such embodiments may be facilitated, at least in part, by the use of an emerging, revolutionary technology that may be termed correlated magnetics. This revolutionary technology referred to herein as correlated magnetics was first fully described and enabled in the co-assigned U.S. Pat. No. 7,800,471 issued on Sep. 21, 2010, and entitled "A Field Emission System and Method". The contents of this document are hereby incorporated herein by reference. A second generation of a correlated magnetic technology is described and enabled in the co-assigned U.S. Pat. No. 7,868,721 issued on Jan. 11, 2011, and entitled "A Field Emission System and Method". The contents of this document are hereby incorporated herein by reference. A third generation of a correlated magnetic technology is described and enabled in the co-assigned U.S. Pat. No. 8,179,219 issued on May 15, 2012, and entitled "A Field Emission System and Method". The contents of this document are hereby incorporated herein by reference. Another technology known as correlated inductance, which is related to correlated magnetics, has been described and enabled in the co-assigned U.S. Pat. No. 8,115,581 issued on Feb. 14, 2012, and entitled "A System and Method for Producing an Electric Pulse". The contents of this document are hereby incorporated by reference.

Material presented herein may relate to and/or be implemented in conjunction with multilevel correlated magnetic systems and methods for producing a multilevel correlated magnetic system such as described in U.S. Pat. No. 7,982,568 issued Jul. 19, 2011 which is all incorporated herein by reference in its entirety. Material presented herein may relate to and/or be implemented in conjunction with energy generation systems and methods such as described in U.S. patent application Ser. No. 12/895,589 filed Sep. 30, 2010, which is all incorporated herein by reference in its entirety. Such systems and methods described in U.S. Pat. No. 7,681,256 issued Mar. 23, 2010, U.S. Pat. No. 7,750,781 issued Jul. 6, 2010, U.S. Pat. No. 7,755,462 issued Jul. 13, 2010, U.S. Pat. No. 7,812,698 issued Oct. 12, 2010, U.S. Pat. Nos. 7,817,002, 7,817,003, 7,817,004, 7,817,005, and 7,817,006 issued Oct. 19, 2010, U.S. Pat. No. 7,821,367 issued Oct. 26, 2010, U.S. Pat. Nos. 7,823,300 and 7,824,083 issued Nov. 2, 2011, U.S. Pat. No. 7,834,729 issued Nov. 16, 2011, U.S. Pat. No. 7,839,247 issued Nov. 23, 2010, U.S. Pat. Nos. 7,843,295, 7,843,296, and 7,843,297 issued Nov. 30, 2010, U.S. Pat. No. 7,893,803 issued Feb. 22, 2011, U.S. Pat. No. 7,956,711 and 7,956,712 issued Jun. 7, 2011, U.S. Pat. No. 7,958,575, 7,961,068 and 7,961,069 issued Jun. 14, 2011, U.S. Pat. No. 7,963,818 issued Jun. 21, 2011, and U.S. Pat. Nos. 8,015,752 and 8,016,330 issued Sep. 13, 2011, and U.S. Pat. No. 8,035,260 issued Oct. 11, 2011 are all incorporated by reference herein in their entirety.

In accordance with the present invention, a polarity transition (or transition region) between two conventionally magnetized opposite polarity regions of a multiple pole magnet is tailored by printing a defined pattern of one or more 'reinforcing' magnetic sources called maxels alongside a polarity transition boundary in the transition region to change the magnetic field characteristics across the transition region, for example, to produce a steeper transition slope. FIG. 1A depicts a top view of a transition region 100 between two opposite polarity poles of a conventionally magnetized multiple pole magnetic structure (or multiple pole magnet) 102. A transition region corresponds to the area of the magnetic structure where a magnetic field transitions from a North polarity to a South polarity (or vice versa). As shown, the multiple pole magnet 102 has two halves where the top of one half has a North polarity region and the top of the other half has a South polarity region. FIG. 1B depicts a side view of the same multiple pole magnet 102 shown in FIG. 1A. As shown in FIG. 1B, the multiple pole magnet 102 has two halves, where the left half has a North polarity region on top of a South polarity region and the right half has a South polarity region on top of a North polarity region. The magnitude of the magnetic field across a transition region 100 corresponds to a portion of a magnetic field cross section curve such as depicted in FIG. 1C that can be represented by a sloped line that crosses zero at a polarity transition boundary when polarity changes (or transitions). The magnetic field cross section may correspond to magnetic field measurements taken across the multiple pole magnet, which might be measurements taken along a line parallel to the surface of the magnet from −X/2 to X/2 with a constant Y value (e.g., 0) and a constant Z value (e.g., substantially near the surface of the multiple pole magnet 102). The peak amplitudes of +/−1500 Gauss used in FIG. 1C and other similar plots that follow were arbitrarily selected. One skilled in the art will understand that the portion of the magnetic field cross section that corresponds to the polarity transition will have a curve that begins at a first point corresponding to a first polarity field strength, crosses the polarity transition boundary (i.e., 0 field strength) and ends at a second point corresponding to a second polarity field strength, where the measured curve may be a line or some other shape but which can be otherwise approximated by a line going from the first point through zero to the second point, where the magnitudes of the field strengths may be substantially the same or may be substantially different.

For certain applications, a shallow slope may represent wasted magnetic energy because the transition region has a weaker magnetic field than outside the transition region. For example, a voice coil relies on the interaction between current running through a copper coil situated in an air gap above a magnet and the field lines extending from the face of the magnet. The transition region essentially creates a weaker area in the middle of the magnetic structure (i.e., a dead zone) in which the desired field interaction with the copper coil is much weaker than in those areas outside the transition region. Minimizing the transition region by creating a steeper slope means that more of the magnetic structure is providing a force sufficient to move the actuator arm. A voice coil having a transition region with a steeper slope will more efficiently use magnetic material, may have higher torque, and may be able to use a smaller coil to achieve comparable performance.

Reinforcing maxels printed in the transition region may comprise a plurality of round maxels of the same polarity printed next to each other (e.g., in a row) or partially overlapping each other. Alternatively, a reinforcing maxel may have an elongated shape such as a rectangular shape. FIG. 2A depicts a first row of North polarity reinforcing maxels 202 printed on the left side of the polarity transition boundary of the pre-reinforcement transition region and a second row of South polarity reinforcing maxels 204 printed on the right side of the polarity transition boundary of the pre-reinforcement transition region, where the objective is to produce a reinforced transition region in a magnetic field cross section such as depicted in FIG. 2B that has a steeper slope than the pre-reinforcement transition region.

Figure 3B:
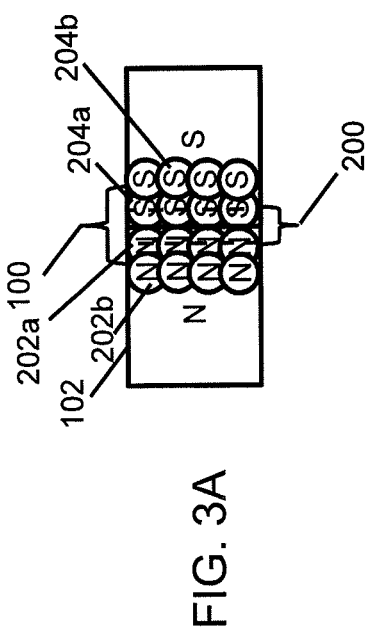
Figure 3C:
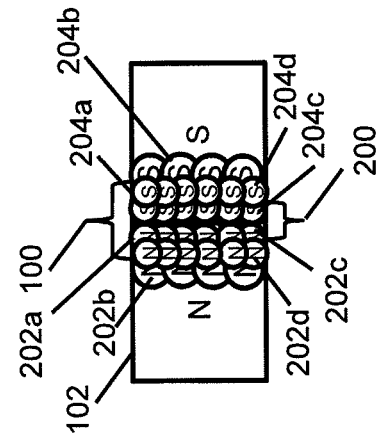
Figure 3D:
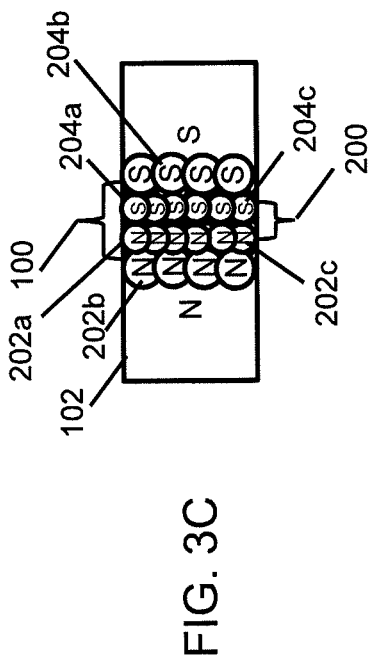

FIGS. 3A-3D show various approaches for printing reinforcing maxels in order to tailor the magnetic field across a transition region. In FIG. 3A, two overlapping rows of North polarity maxels 202a 202b and two overlapping rows of South polarity maxels 204a 204b are shown. In FIG. 3B, an additional row of North polarity maxels 202c and an additional row of South polarity maxels 204c are added to the rows shown in FIG. 3A. In FIG. 3C, rows of smaller North maxels 202c and South polarity maxels 204c are printed over the inner most rows of North maxels 202b and South polarity maxels 204b shown in FIG. 3A. In FIG. 3D, an additional row of smaller North polarity maxels 202d and an additional row of smaller South polarity maxels 204d are added to the rows shown in FIG. 3C. Generally, one skilled in the art will recognize that reinforcing maxels of a given polarity can have different sizes and shapes, can be overlapped in various ways, and can be amplitude modulated on a maxel-by-maxel basis to produce desired magnetic field characteristics across a transition region. Reinforcing maxels can be produced by printing only on one side of a piece of magnetizable material or by printing on opposing sides of a piece of magnetizable material. Various techniques for printing maxels are described in pending U.S. patent application Ser. No. 13/240, 355, filed Sep. 22, 2011, and titled "Magnetic Structure Production".

In accordance with one aspect of the invention, reinforcing maxels can be printed with different magnetization directions other than directions perpendicular to the surface of a magnetizable material. For example, Referring to FIG. 2A, reinforcing maxels near the outer edges of the magnetic material could be printed such that North polarity maxels pointed inward and South polarity maxels pointed outward (i.e., away from the material). As such, in addition to the various other maxel characteristics that can be varied as described previously, the magnetization direction can also be varied on a maxel-by-maxel basis to achieve desired magnetic field characteristics across a transition region. Printing with different magnetization directions is described in pending U.S. patent application Ser. No. 13/246,584, filed Sep. 27, 2011, and titled "System and Method for Producing Stacked Field Emission Structures.

One skilled in the art will recognize that subsequent magnetization of a previously magnetized material can involve a method of: a) sensing a magnetic field, b) determining magnetization events to tailor the field and then c) performing the magnetization events, which is a process that can be repeated as necessary to meet established one or more criterion (e.g., a transition slope).

Figure 4A:
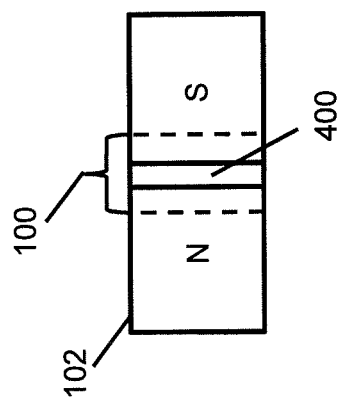
FIG. 4A depicts a top view of an exemplary axially magnetized conventional multiple pole magnet having a North polarity side and South polarity side that are separated by a non-magnetized area.
Figure 4B:
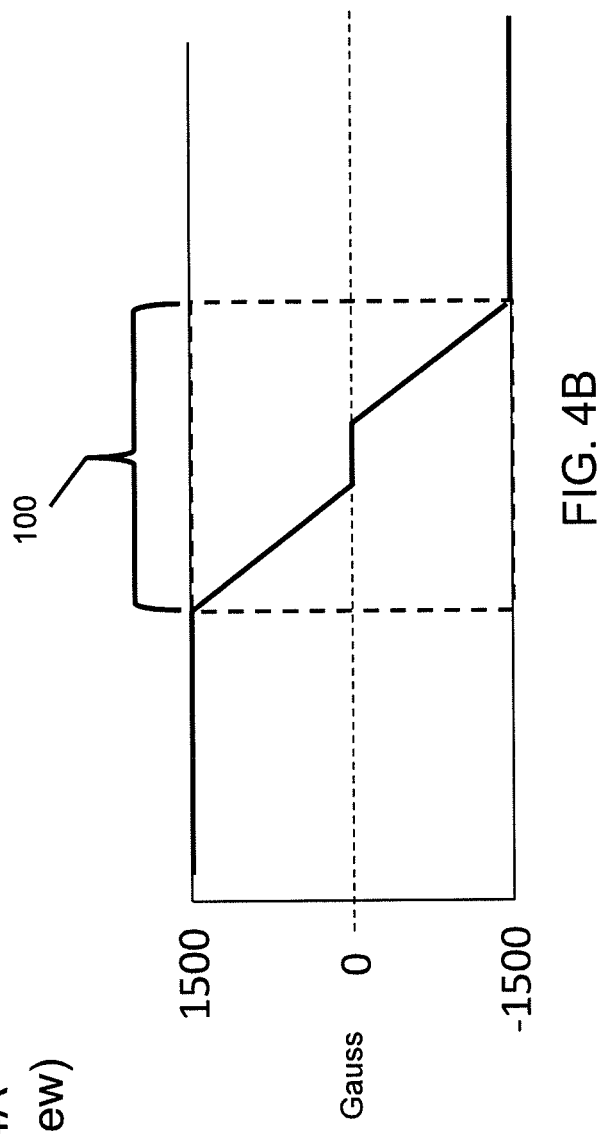
FIG. 4B depicts an exemplary magnetic field cross section of the multiple pole magnet of FIG. 4A.

A conventional magnet may be magnetized such that a transition region includes a non-magnetized area between North and South polarity areas such as shown in FIG. 4A. Under such an arrangement, reinforcing maxels can be printed to magnetize the non-magnetized area and produce a reinforced magnet transition region such as shown in FIG. 2A. A magnetic field cross section of the magnet of FIG. 4A is depicted in FIG. 4B.

Figure 5B:
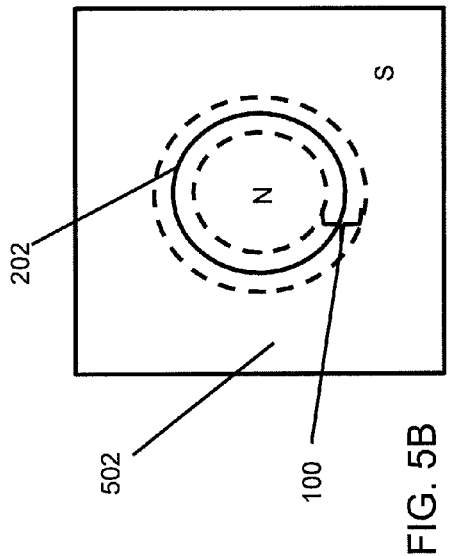
FIG. 5B depicts an exemplary multiple pole magnet produced by printing a North polarity maxel on the South polarity side of a conventional single pole magnet and a corresponding polarity transition about the polarity transition boundary between the North and South polarity portions of the multiple pole magnet.
Figure 5D:
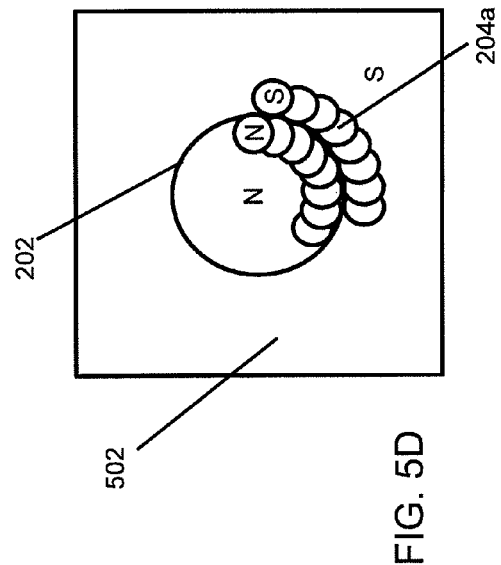
FIG. 5D depicts exemplary reinforcing North polarity maxels printed on the North polarity side of the polarity transition boundary between the North and South polarity portions of the multiple pole magnet and exemplary reinforcing South polarity maxels printed on the South polarity side of the polarity transition boundary between the North and South polarity portions of the multiple pole magnet.
Figure 5A:
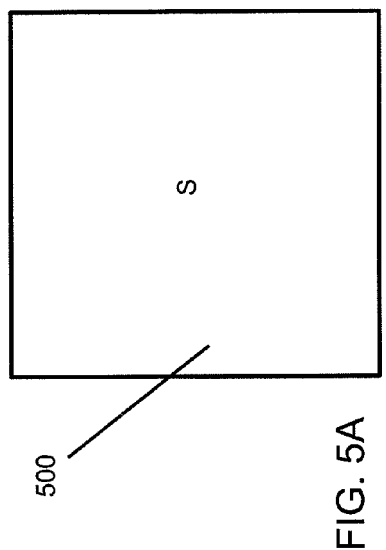
FIG. 5A depicts the South polarity side of a conventional single pole magnet.
Figure 5C:
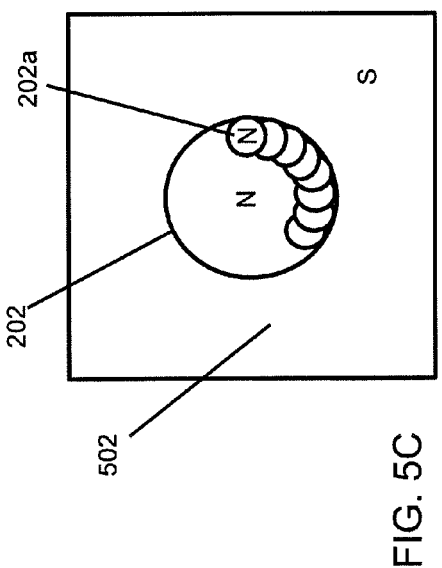
FIG. 5C depicts exemplary reinforcing North polarity maxels printed on the North polarity side of the polarity transition boundary between the North and South polarity portions of the multiple pole magnet.

Under another arrangement, reinforcing maxels are printed inside and/or outside the perimeter of a larger maxel. FIG. 5A depicts the South polarity side of a conventional single pole magnet 500. FIG. 5B depicts a multiple pole magnet 502 produced by printing a North maxel 202 on the South side of the conventional axially magnetized magnet 500 of FIG. 5A. A transition region 100 is shown having a portion inside the perimeter of the maxel and a portion outside the perimeter of the maxel. FIG. 5C depicts smaller North polarity maxels 202a having been printed inside the perimeter of the larger North polarity maxel 200. FIG. 5D shows South polarity maxels 204a printed outside the perimeter of the large North maxel 202.

Generally, maxels of different sizes can be printed such that they are overlaid within a given area to produce a composite magnetic field. FIG. 6A depicts three exemplary maxel sizes (i.e., diameters) for round maxels. FIG. 6B depicts a first large maxel with three smaller maxels printed inside its perimeter. FIG. 6C depicts the first large maxel with three smaller maxels having six even smaller maxels printed inside its perimeter. One skilled in the art will recognized that smaller and smaller maxels can be printed inside the perimeter and that such overlapping of maxels of N different sizes is similar to building up a radio frequency pulse using N harmonics of sine waves as shown in FIG. 6D and described in U.S. Pat. No. 7,428,258, which is incorporated herein by reference.

Figure 7B:
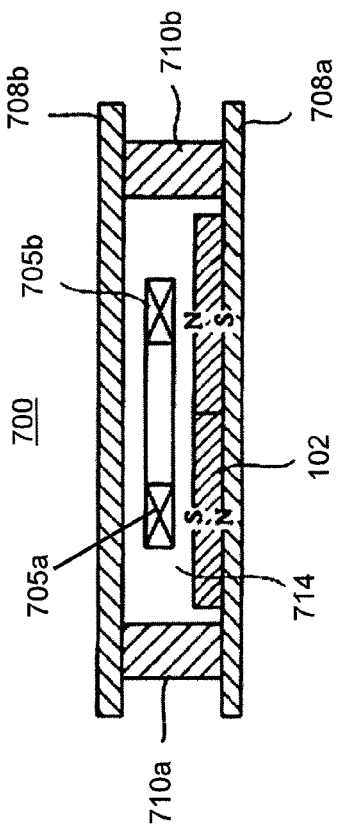
FIGS. 7A and 7B depict top and side views of an exemplary voice coil assembly.
Figure 7A:
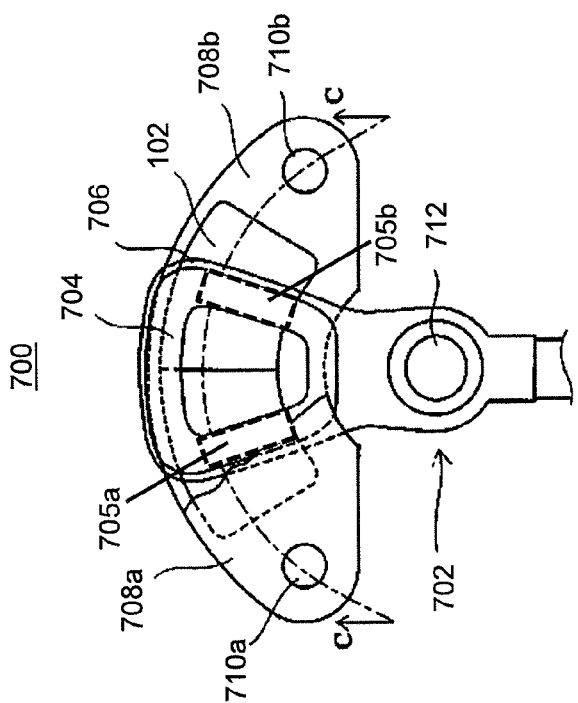

In accordance with the invention, a voice coil system-level design might use a magnetic structure having small polarity regions where all the magnetic flux between adjacent polarity regions on the back of the magnet can be shunted using a shunt plate to increase the force being projected from the front of the magnet into the air gap and then to either a metal plate or preferably a complementary printed magnetic structure on the other side of the air gap. With an even number of regions and a region size that allows all flux to be routed through the shunt plate, an embodiment of the present invention should be able to avoid routing any flux in the steel that extends between the magnets (the pieces that are perpendicular to the planar surface of the magnet, and parallel to the field lines extending from the magnets). In current designs, such as depicted in FIGS. 7A and 7B, flux from the back of the magnet is being routed through the steel plate that surrounds the entire assembly and provides no usable force (i.e., never enters the air gap and therefore does not interact with the copper coil). Referring to FIGS. 7A and 7B, a voice coil assembly 700 includes an arm assembly 702, a hollow coil 704, hold members 706, a yokes 708a 708b, supports 710a 710b, shaft 712, and a multiple pole magnet 102. The hollow coil includes two coil portions commonly referred to as coil legs 705a 705b.

Figure 8A:
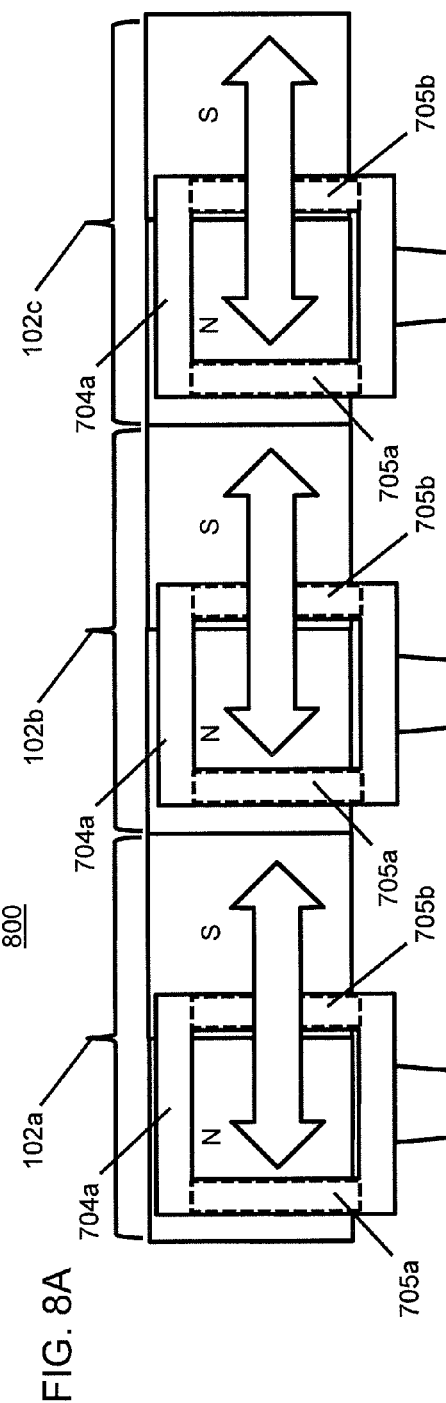
FIG. 8A depicts a top view of an exemplary voice coil assembly comprising multiple voice coils interacting with a multiple pole magnet having six polarity regions.
Figure 8B:
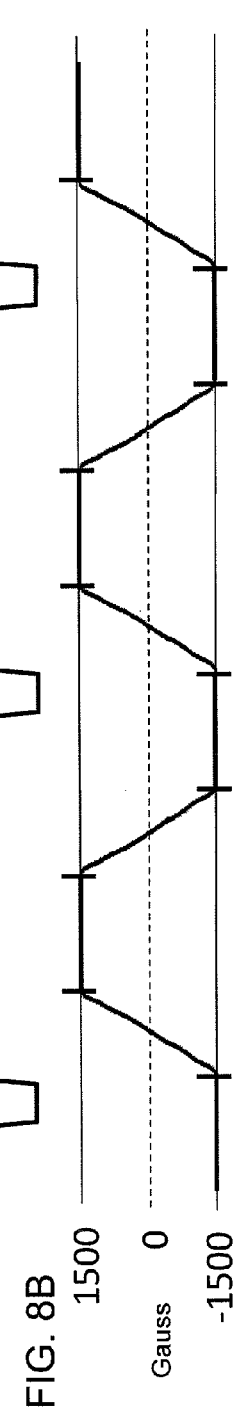
FIGS. 8B and 8C depict exemplary magnetic field cross sections of the multiple pole magnet of FIG. 8A before and after reinforcing maxels have been printed alongside transition boundaries.
Figure 8C:
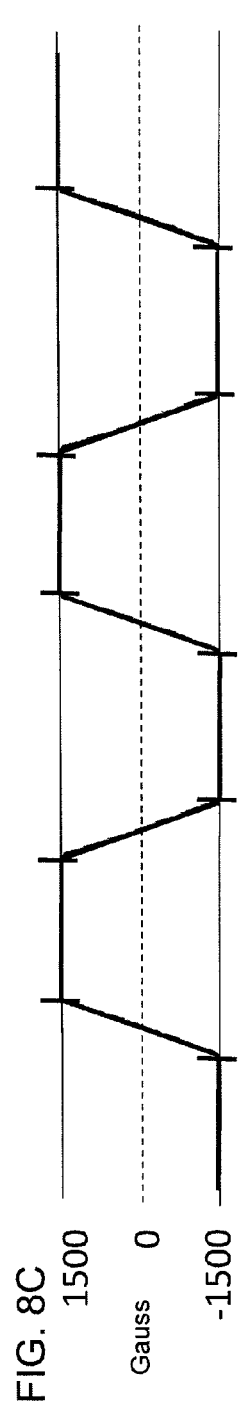

A typical prior art voice coil has a relatively large loop so that the current in the coil legs interacts with both a North polarity region and a South polarity region at the same time—though flowing in opposite directions through the respective coil legs interacting with each respective polarity region to produce movement in a single direction. In accordance with the invention, a voice coil system can be made up of many smaller loops much like tines on a comb or a fork, where the size of the loops is related to the size of the polarity regions, such that current through each loop interacts with both polarity regions. Instead of two coil legs interacting with two polarity regions, there could be, for example, a dozen coil legs with each two coil legs of the dozen coil legs interacting with a respective two of a dozen polarity regions (e.g., 6 North and 6 South), where each polarity region would be providing approximately the same amount of torque as the single coil of the typical prior art voice coil as long as the flux density in the air gap above the polarity region is the same as the flux density in a given portion of the existing design. Such an arrangement is shown in FIG. 8A, where the multiple voice coil assembly 800 has three arm assemblies 702a-702c that are configured to move back and forth as the magnetic fields of the multiple pole magnets 102a-102c interact with the magnetic fields of the coil legs 705a 705b of the hollow coils 704a-704c. FIG. 8B depicts a magnetic field cross section corresponding to the three multiple pole magnets 102a-102c of FIG. 8A prior to printing reinforcing maxels. FIG. 8C depicts a magnetic field cross section corresponding to the three multiple pole magnets 102a-102c of FIG. 8A after transition regions have been reinforced with reinforcing maxels.

In a preferred embodiment there would be a balance of the number of polarity regions against inefficiencies of the transition zones and the size of the air gap, taking into account the shape of the coil required to establish movement.

To maximize constant flux area, the coil legs would not necessarily be the same size. The middle pair of legs could be wider than the legs on either side because there are no edge effects in the middle of the magnetic structure. A narrower coil could be used and still get full movement within the constant flux area of the outer leg pairs. Flux losses should be lower in the outside polarity regions than in the outer edges of current designs because the design above has outer polarity regions with a smaller area. With the multiple pole/multiple loop system, one can place the pivot point closer to the magnet to achieve the same arm travel range as with the conventional two-pole design.

A multiple pole/multiple loop system could be controlled by a switching mechanism to allow multiple coils to move beyond a single pole pair. If, for example, it was desirable for a coil to stop at 7 specific locations, it might be possible to switch coils to relevant Barker codes in succession over a Barker-7 printed in the magnet as one example. One skilled in the art will recognize that magnetic structures can have regular patterns or have irregular polarity patterns. Regular patterns may be alternating polarity patterns. Irregular polarity patterns may be produced randomly or be in accordance with designed codes such as Barker codes.

Smaller magnetic regions and lower field strength also means less back iron is required to channel flux on the back side, which saves steel (cost, space, weight).

Under one arrangement, in an embodiment that includes for example three coils, power consumption could be decreased by using only 1 or 2 loops out of three to move the arm, where seek time goes up, but power consumption goes down. Separate loops might also reduce lag as when current direction changes.

In accordance with another aspect of the invention, a conventional axially magnetized ring shaped single pole magnet 900 such as shown in FIG. 9A can be converted into a multiple pole magnetic structure (or multiple pole magnet) 902 by printing opposite polarity maxels on portions of the conventional magnet 900. FIG. 9A depicts the South polarity side of a conventional ring shaped single pole magnet 900. FIG. 9B depicts a multiple pole magnet 902 having four alternating polarity regions produced by printing patterns of different sized maxels on two opposing 90° arc segments of the single pole magnet 900. The maxel patterns include reinforcing maxels 202*b*, 202*c* printed alongside the polarity transition boundaries. Referring to FIG. 9B, each of the two printed maxel patterns includes five overlapping North polarity maxels of a first size 202*a* and two groups of overlapping smaller North polarity maxels of a second size 202*b*, 202*c*. Under another arrangement shown in FIG. 9C, two groups of maxels 204*a*, 204*b* having a South polarity are printed within each of the two South polarity portions of the multiple pole magnet 902 alongside polarity transition boundaries with the North polarity portions to achieve desired magnetic field characteristics across the polarity transitions of the structure.

While particular embodiments of the invention have been described, it will be understood, however, that the invention is not limited thereto, since modifications may be made by those skilled in the art, particularly in light of the foregoing teachings.

The invention claimed is:

1. A magnetic structure having multiple poles, comprising:
   a first polarity region magnetized to have a first polarity;
   a second polarity region magnetized to have a second polarity; and
   a polarity transition boundary, said first polarity region having at least one reinforcing maxel having said first polarity that was printed alongside said polarity transition boundary and said second polarity region having at least one reinforcing maxel having said second polarity that was printed alongside said polarity transition boundary.

2. The magnetic structure of claim 1, wherein said at least one reinforcing maxel having said first polarity and said at least one reinforcing maxel having said second polarity change magnetic field characteristics across a polarity transition.

3. The magnetic structure of claim 2, wherein the polarity transition has a steeper slope than the slope of the polarity transition of the magnetic structure without said at least one reinforcing maxel having said first polarity and said at least one reinforcing maxel having said second polarity.

4. The magnetic structure of claim 1, wherein said at least one reinforcing maxel having said first polarity and said at least one reinforcing maxel having said second polarity enable more efficient use of magnetic material.

5. The magnetic structure of claim 1, wherein said at least one reinforcing maxel having said first polarity and said at least one reinforcing maxel having said second polarity produce higher torque.

6. The magnetic structure of claim 1, wherein said at least one reinforcing maxel having said first polarity comprises a round maxel.

7. The magnetic structure of claim 1, wherein said at least one reinforcing maxel having said first polarity comprises an elongated maxel.

8. The magnetic structure of claim 7, wherein said an elongated maxel is a rectangular maxel.

9. The magnetic structure of claim 1, wherein said at least one reinforcing maxel having said first polarity comprises a first maxel that overlaps a second maxel.

10. The magnetic structure of claim 1, wherein said at least one reinforcing maxel having said first polarity comprises a row of maxels.

11. The magnetic structure of claim 10, wherein said row of maxels comprises maxels printed next to each other.

12. The magnetic structure of claim 1, wherein said at least one reinforcing maxel having said first polarity comprises maxels having different sizes.

13. The magnetic structure of claim 1, wherein said at least one reinforcing maxel having said first polarity comprises maxels having different shapes.

14. The magnetic structure of claim 1, wherein said at least one reinforcing maxel having said first polarity comprises maxels having different amplitudes.

15. The magnetic structure of claim 1, wherein said magnetic structure was produced by printing a maxel having said first polarity onto a side of a single pole magnet having said second polarity.

16. The magnetic structure of claim 1, wherein said magnetic structure comprises three or more polarity regions.

17. The magnetic structure of claim 16, wherein said three or more polarity regions have an irregular polarity pattern.

18. The magnetic structure of claim 17, wherein said irregular polarity pattern is in accordance with a designed code.

19. The magnetic structure of claim 18, wherein said designed code is a Barker code.

20. The magnetic structure of claim 16, wherein said three or more polarity regions have an alternating polarity pattern.

* * * * *